United States Patent [19]
Unterberg

[11] 4,093,044
[45] June 6, 1978

[54] SLIDING CALIPER DISC BRAKE

[75] Inventor: Hartmut Unterberg, Koblenz-Metternich, Germany

[73] Assignee: Girling Limited, Birmingham, England

[21] Appl. No.: 768,722

[22] Filed: Feb. 15, 1977

[30] Foreign Application Priority Data

Feb. 18, 1976 United Kingdom ............... 6310/76

[51] Int. Cl.² ............................................ F16D 55/224
[52] U.S. Cl. .................................. 188/73.3; 188/206 R
[58] Field of Search ............ 188/71.1, 73.1, 73.3–73.6, 188/206 R, 206 A

[56] References Cited

U.S. PATENT DOCUMENTS

| | | | |
|---|---|---|---|
| 3,552,527 | 1/1971 | Hayes | 188/73.3 |
| 3,782,510 | 1/1974 | Rath | 188/73.3 |
| 3,930,564 | 1/1976 | Kobayashi et al. | 188/73.3 |

FOREIGN PATENT DOCUMENTS 2,538,565  11/1976  Germany .......................... 188/73.3

*Primary Examiner*—Duane A. Reger
*Attorney, Agent, or Firm*—Scrivener, Parker, Scrivener & Clarke

[57] ABSTRACT

A sliding caliper disc brake comprises a caliper member adapted to straddle a minor portion of the periphery of a rotatable disc, a carrier member for fixing to a vehicle, guide means guiding the caliper member for sliding relative to the carrier member, and an actuator for directly urging a friction pad onto one side of the disc to cause the caliper member to slide relative to the carrier member to apply by reaction an opposite friction pad to the other side of the disc. The guide means includes a pair of pins connected to one of the members and slidable within respective openings in receiving means connected to the other of the two members. In order to locate the caliper member against undue movement about either of the two pins, each pin is a snug sliding fit within the respective opening. Furthermore, at least one of the pins or receiving means is connected to the associated member by a resilient element adapted to flex so as to limit forces transmitted between the pins and receiving means.

20 Claims, 11 Drawing Figures

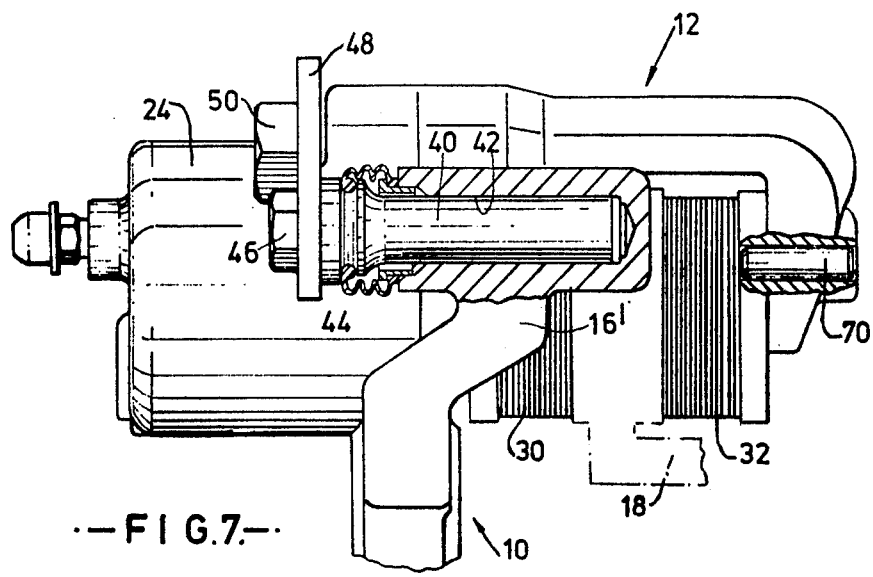
—FIG.7.—
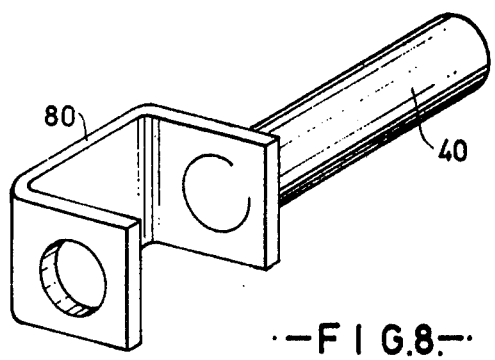
—FIG.8.—
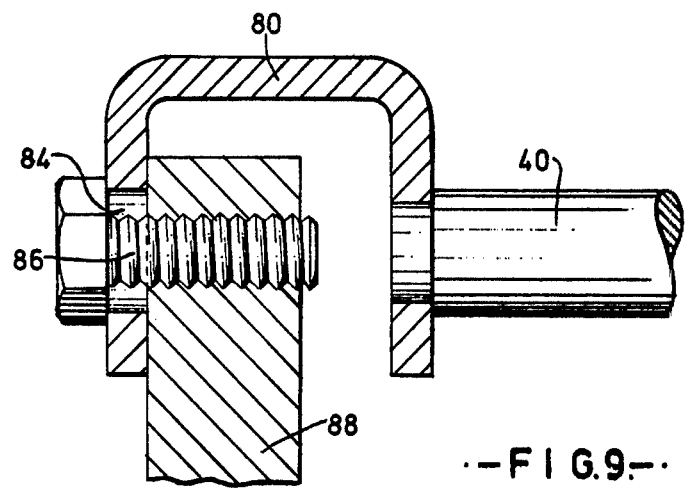
—FIG.9.—

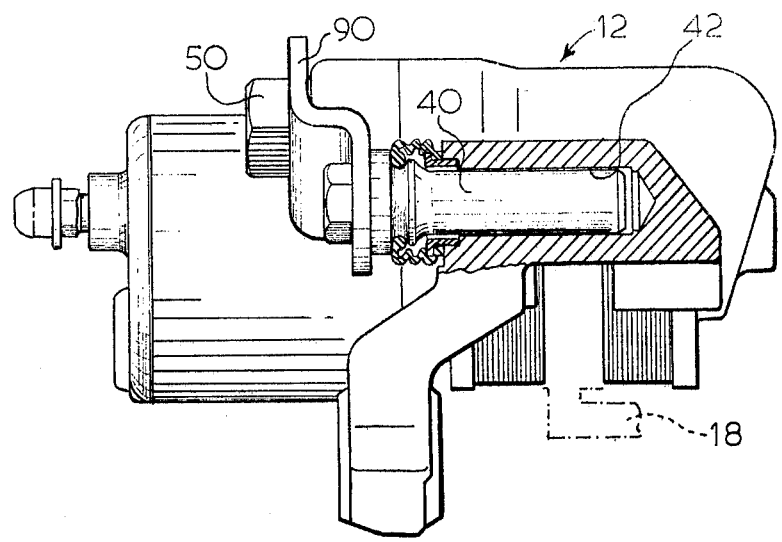
FIG. 10.
FIG. 11.
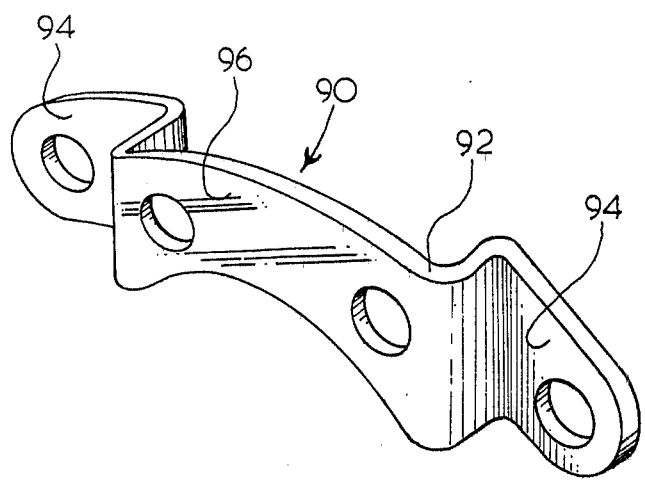

SLIDING CALIPER DISC BRAKE

The present invention relates to sliding caliper disc brakes.

The invention is particularly concerned with vehicle brakes of the type comprising a carrier member for fixing to a vehicle frame or like portion, a caliper member, guide means guiding the caliper member for sliding relative to the carrier member and an actuator for urging a first friction pad onto a braking surface to cause the caliper member to slide relative to the carrier member and apply a second friction pad to a second braking surface.

The problem with known guide means is the difficulty of locating the caliper member adequately against spurious movements under heavy vibration and braking while at the same time ensuring that the caliper member can slide freely relative to the carrier member.

It has been proposed to mount the caliper member on the carrier member by means of a pair of pins which are slidable in respective openings in one of the members and are secured to the other of the members. However, in such constructions it is necessary to centre the pins very accurately in their openings to avoid binding in operation resulting in differential braking at different vehicle wheels arising from different proportions of the available hydraulic line pressure needed to overcome initial resistance to sliding. Furthermore, under heavy braking the carrier member may deflect to produce intermittent binding of the pins in their openings resulting in stress to the pins and parts of the caliper member.

One proposed answer to the problem of ensuring free sliding of the caliper member is to encase the pins within rubber bushes. This reduces the likelihood of binding but, at the same time, may permit undersirable movement of the caliper member. Furthermore, there is a tendency for brakes to heat up which may cause deterioration of the rubber.

A possible solution regarding the location of the caliper member is to position and shape the openings so as to locate the caliper member firmly against spurious tipping movements while at the same time permitting deflection of the carrier member without undue loading of the pins. This, however, would be a more expensive solution than, for example, one involving regular cylindrical shapes of openings for the pins.

It is an aim of the present invention, therefore, to provide a brake having guide means in the form of a pair of pins and associated openings, and a caliper member which is located against undue movement about either of the two pins.

A further aim is to provide means in the brake for restricting the loads applied to the pins through distortion of the carrier member under heavy braking.

Another aim of the invention is to provide the brake with means for accommodating manufacturing tolerances in the positioning of the openings for receiving the pins.

Still another aim is to provide a solution to the above mentioned problems which is relatively economical compared with the production of specially shaped and arranged openings for the pins.

According to the present invention, a sliding caliper disc brake comprises a caliper member adapted to straddle a minor portion of the periphery of a rotatable disc, a carrier member for fixing to a vehicle, guide means guiding the caliper member for sliding relative to the carrier member, and an actuator for directly urging a friction pad onto one side of the disc to cause the caliper member to slide relative to the carrier member to apply by reaction an opposite friction pad to the other side of the disc, said guide means including a pair of pins connected to one of the members and slidable within respective openings in receiving means connected to the other of the two members, each pin being a snug fit within the respective opening in a radial direction, and at least one of the pins or receiving means being connected to the associated member by a resilient element adapted to flex so as to limit forces transmitted between the pins and the receiving means.

Since it is convenient to make both the openings and the pins cylindrical, the tight radial fit of the pins in their openings results also in a tight circumferential location which in known brakes might lead to binding. The invention aims to permit the use of cylindrical pins and openings, and the use of tight fits to provide good location, but without the problems of binding which this has hitherto entailed.

The tight radial location of the pins within the respective openings prevents excessive movement of the caliper member about either pin, and the resilient element absorbs loads produced by distortion of the carrier member or inaccurate positioning of the pins or openings, thus allowing the pins to be a tight sliding fit within the openings but resisting binding.

The resilient element is preferably a steel plate, steel being sufficiently strong and ductile for the purpose and at the same time being a relatively cheap metal. The plate may be flat for ease of manufacture or may be of U-shaped cross-section, a flat plate possibly having been formed into a U with dimensions suitable for the prevailing requirements regarding flexibility. Also, for ease of assembly of the parts of the brake, the plate, when flat, may be symmetrical on either side of a central portion.

A compact construction may conveniently be obtained by connecting the pins to the caliper member, either directly or by way of the resilient element. It is convenient if the pins are secured to the resilient element and the receiving means are integral with the carrier member, as this has been found to take up the least installation space in most vehicles.

Advantageous bolts are used, rather than e.g. welding, to secure the resilient element to the associated member when the element and member are made of different metals. The use of bolts is particularly applicable when the resilient element is secured to a caliper member of two-part construction whose parts are secured together by bridge bolts, since the bridge bolts may also serve to secure the element of the caliper member.

The invention is further described, by way of example, with reference to the accompanying drawings in which:

FIG. 1 is a side view partly in section, of a sliding caliper disc brake constructed in accordance with the invention, FIG. 2 is a section through the disc brake taken on the line II—II in FIG. 3, FIG. 3 is a rear view of the disc brake, FIG. 4 is a front view of the disc brake partly sectioned on the line IV—IV in FIG. 2, FIG. 5 is a rear view of a carrier member for a modified sliding caliper disc brake; and FIG. 6 is a section on the line VI—VI in FIG. 5, FIG. 7 is a side view, partly in section of another caliper disc brake according to the invention;

FIG. 8 is a perspective view of a resilient element and pin of a further disc brake according to the invention, FIG. 9 is a fragmentary section showing the resilient element of FIG. 8 secured to a caliper member;

FIG. 10 is a side view partly in section of a further sliding caliper disc brake according to the invention; and FIG. 11 is a perspective view of a resilient element used in the brake of FIG. 10.

Figure 1:
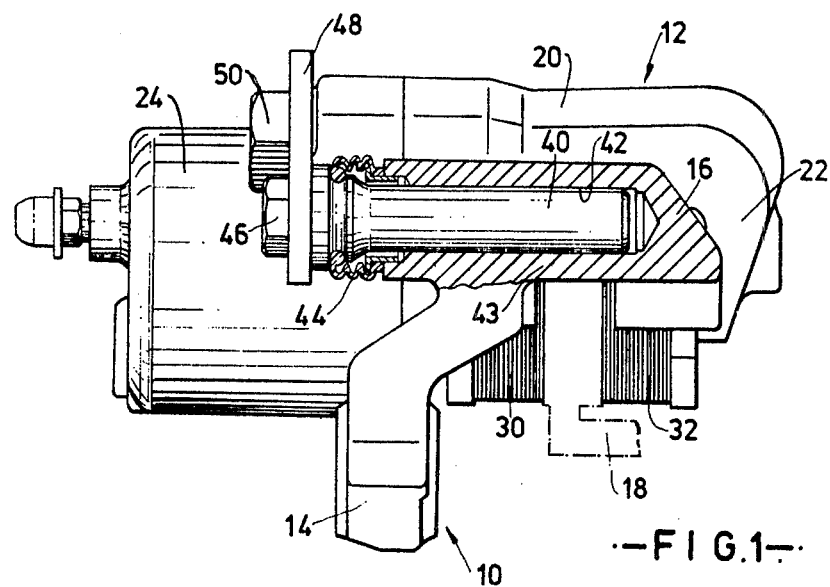
Figure 2:
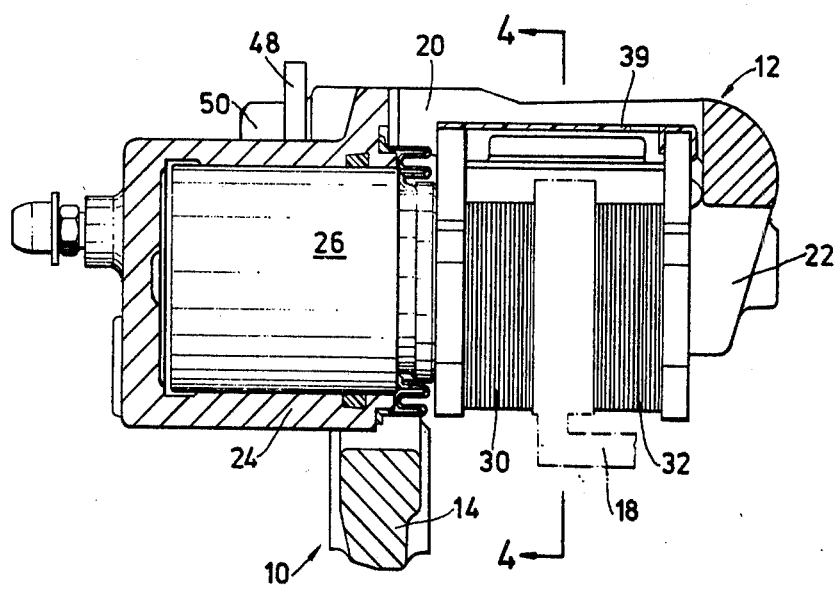

The disc brake shown in FIGS. 1 to 4 is formed of a carrier member generally designated 10 and a caliper member generally designated 12. The carrier member 10 has a downwardly extending portion 14 by which the carrier member is adapted to be fixed to a vehicle frame, and a pair of arms 16 which extend across the periphery of a rotatable disc 18. The caliper member 12 has a centrally apertured crown or bridge portion 20 which interconnects a bifurcated front limb 22 and a rear limb 24 extending downwardly on opposite sides of the disc. The rear limb 24 of the caliper member is formed with a hydraulic cylinder containing a piston 26 which abuts against a directly actuated friction pad 30. A second, indirectly actuated friction pad 32 is engaged by the front limb 22 of the caliper member. As is clear from FIG. 3 and 4, the carrier member arms 16 are formed with sliding surfaces 34 for engagement with the sides of the back plates of the friction pads. The pads 30 and 32 are therefore slidably mounted in the carrier member so that drag forces experienced by the friction pads when they are clamped against a rotating disc are transmitted directly to the carrier member. Lugs 36 extending from the pad back plates slidably seat on shoulders 38 formed on the carrier member arms 16. A leaf spring 39 urges the pads radially inwardly of the disc so as to bias the lugs 36 into engagement with the shoulders 38.

The caliper member is slidably mounted on the carrier member so that introduction of hydraulic fluid under pressure into the cylinder to cause the directly actuated pad 30 to be urged against one side of the disc 18 results in the caliper member slidably axially of the disc and applying the indirectly actuated pad 32 to the other side of the disc.

The caliper member 12 is slidably guided on the carrier member 10 by guide or coupling means which comprise a pair of cylindrical pins 40 slidable in blind cylindrical openings 42 formed in receiving means 43 integral with the carrier member arms 16. The pins are a tight sliding fit within the openings 42, the shape of the pins and openings permitting accurate machining thereof economically during manufacture. Sealing boots 44 retain the pins in their openings and protect the sliding surfaces of the pins and openings against the ingress of dirt and moisture. The projecting ends of the pins 40 are drilled and threaded to receive clamping screws 46 which clamp the pins to two symmetrically arranged limbs 47 of a resilient element in the form of a flexible plate 48 fastened between the limbs 47 by bolts 50 to the caliper member 12. The holes in the plate 48 through which the clamping screws pass may be made sufficiently oversized to allow lateral adjustment of the pins 40 during attachment of the caliper member to the carrier member so as to accommodate variations in the spacing of the opening 42 arising from manufacturing inaccuracies.

When the brake is in use, clamping of the pads 30 and 32 against the rotating disc 18 will cause the pads to be dragged circumferentially of the disc and transmit the drag force to one or other of the carrier member arms 16 depending upon the direction of rotation of the disc. Under conditions of heavy braking, such transmission of drag force will bend the appropriate carrier member arm outwardly leading to binding of the pins 40 in their opening 42 if no provision were made for accommodation in the sliding connection of such bending, since the separation of the openings is not accompanied by a corresponding separation of the pins.

In the brake shown in FIGS. 1 to 4, the bolts 50 are offset from a line through both pins and this together with the inherent flexibility of the plate 48 allows lateral movement of the pins 40 by elastic bending or elongation or both. For this purpose, the plate 48 is made of a material, typically steel, which is relatively flexible and ductile as compared with the material, normally cast iron, and occasionally a forged metal from which the caliper and carrier members are formed.

Figure 5:
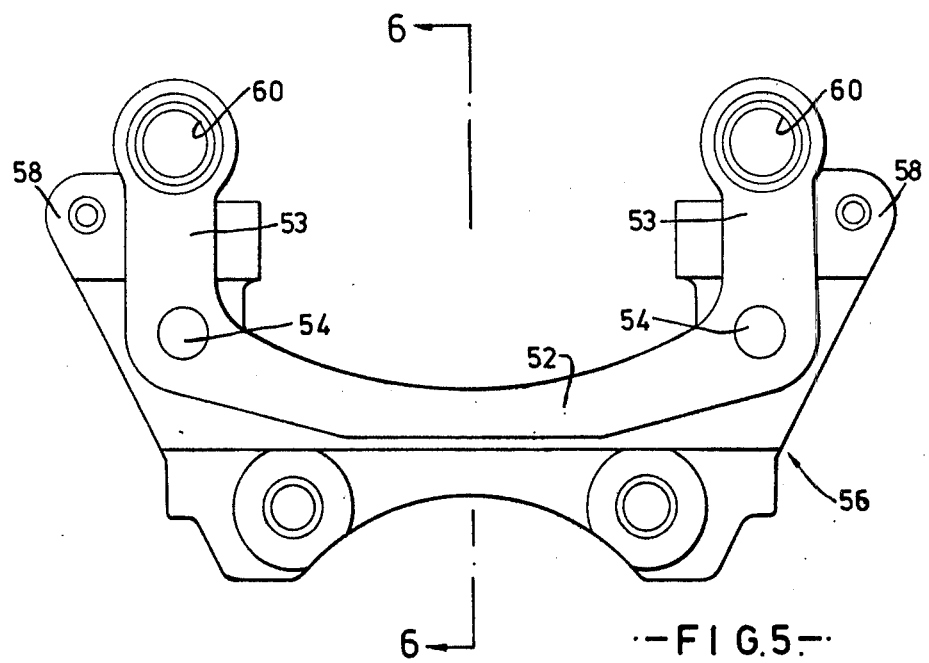
Figure 6:
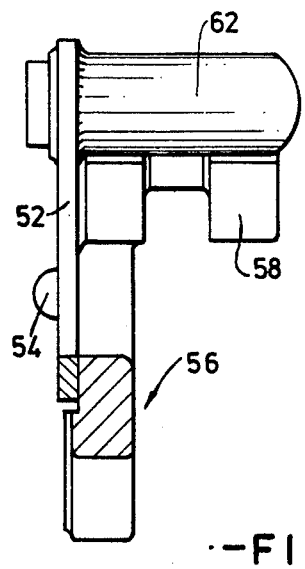

Whereas in FIGS. 1 to 4 the plate 48 is fastened to the caliper member and carries the pins 40, the arrangement shown in FIGS. 5 and 6 has a flat generally U-shaped flexible plate 52 forming the resilient element and fastened at its base portion by rivets 54 to the carrier member 56. As before, the carrier member has arms 58 which extend over the disc to support the pads but in FIGS. 5 and 6, the openings 60 in which the pins (not shown) slide are formed in sockets 62 welded to the two free ends of the limbs 53 of the plate 52.

Figure 3:
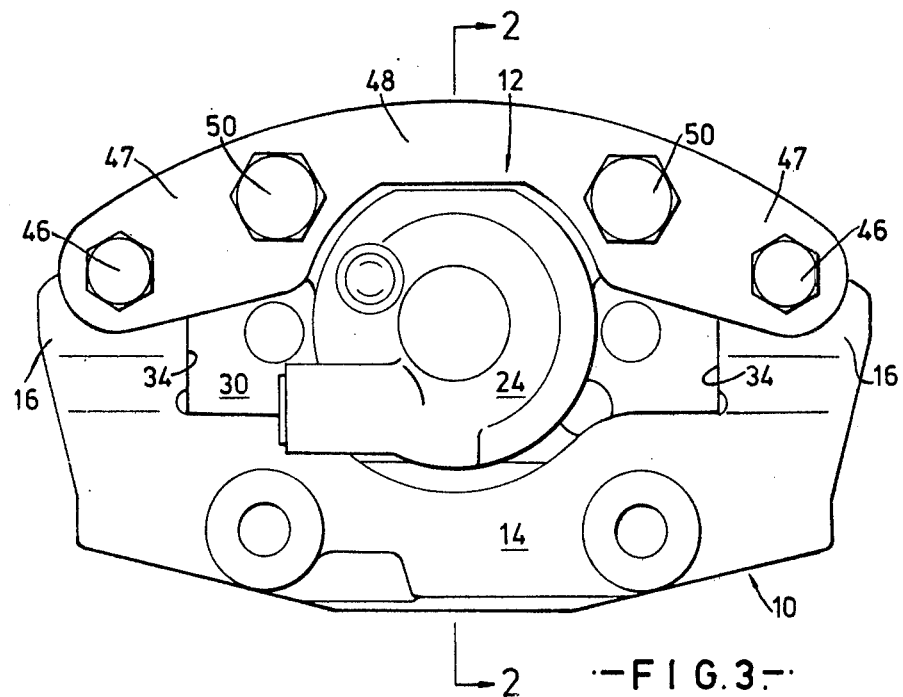
Figure 4:
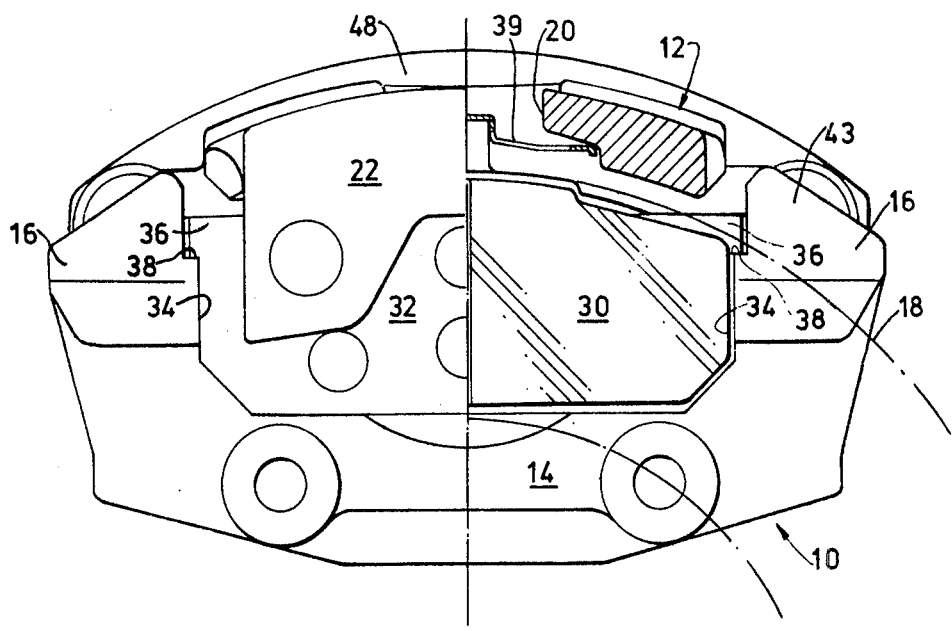

As will be appreciated from a comparison of FIGS. 3 and 5, the plate 52 has by virtue of its shape an increased capacity for bending in the circumferential direction or, more correctly, for maintaining the positions of the sockets 62 as determined by the pins when one or other of the carrier member arms 58 is deformed.

The brake shown in FIG. 7 is similar in many respects to that shown in FIGS. 1 to 4 and like parts are indicated by the same numerals. The difference in this brake is that the arms 16' of the carrier member do not extend across the periphery of the disc 18 and thus only the directly actuated pad 30 is slidably mounted on the carrier member. The back plate of the indirectly actuated pad 32 is firmly attached to the front limb 22 of the caliper member 12 by dowel pins 70 (only one of which is shown).

In operation, the drag force of the pad 32 is thus transmitted to the carrier member (and hence to the frame of the vehicle) through the caliper member 12, through the plate 48 and through the pins 40, whereas in the brake of FIGS. 1 to 4, these components are nominally relieved of this drag force. The components must therefore, be sufficiently robustly constructed to accommodate the extra force.

A further resilient element 80 is shown in FIGS. 8 and 9. This element is of U-shaped cross-section and has a respective pin 40 hot riveted to one of its limbs. The other limb is provided with an opening 84 for receiving a bolt 86 which connects the element and thus the respective pin 40 to a lug 88 on the caliper member. The opening 84 is larger than the bolt 86 to allow for minor adjustments in the lateral positioning of the respective pin 40, due to manufacturing tolerances.

The sizing of the opening 84 may be considered as follows. Any opening intended to receive a bolt must, of course, be larger than the bolt and this normal clearance varies due to manufacturing tolerances. However, in the case of the opening 84, the clearance is greater than such a normal clearance by an amount sufficient to accommodate any mismatching of the pins 40 and the openings 42 resulting from manufacturing tolerances.

The other pin 40 is connected in a like fashion to a second lug on the caliper member allowing for ease of construction. In other respects the brake incorporating the resilient elements 80 resembles that of either FIGS. 1 to 4 or FIG. 7.

Referring now to FIGS. 10 and 11, there is shown an arrangement which differs from the FIG. 1 embodiment only in the shape of the resilient element 90 and in the lengths of the pins 40 and opening 42. The element 90, which is of substantially constant thickness, is centrally recessed as at 92 and is secured by bolts 50 extending through the central recessed portion 92 to the caliper member 12. Two flat limbs 94 extend symmetrically from the recessed portion 92 and the pins 40 are clamped to these limbs 94 as previously. The portion 92 is again offset from a line through the two pins.

By virtue of its shape and arrangement, the element 90 extends from one side of the caliper member 12 to the other with the limbs 94 being located closer to the disc 18 than a flat base 96 of the recessed portion 92. This allows both the pins 40 and the openings 42 to be shorter than in the case of the FIG. 1 embodiment. Furthermore, as compared with the plate 48, the element 90 also has by virtue of its shape an increased capacity for flexing. The dimensions of the plate 90 can be chosen according to the prevailing requirements regarding flexibility.

Although the illustrated embodiments show the pin-receiving openings to be on the carrier member side of the sliding connection, the pins could equally be fastened directly or indirectly to the carrier member and slidable in openings on the caliper member side of the sliding connection through the shape of road wheels usually dictates that the connections as illustrated use the space available to the most economical extent. There could also be flexible means such as a flexible plate between the sliding connection and the carrier member and between the sliding connection and the caliper member so as to take-up such spurious twisting or rotational distortion of the caliper as may occur.

In the case of the U-shaped resilient element shown in FIGS. 8 and 9, mismatch of the pins relative to the openings due to manufacturing tolerances may be accommodated by providing only a normal clearance between the bolt 86 and the element 80 if the opening in the element is disposed eccentrally of the pin 40. The element 80 may then be rotated about the pin 40 during assembly until the opening therein in aligned with the threaded opening in the lug 88 whereupon the bolt 86 is inserted and tightened. The eccentricity of the element opening relative to the pin is determined by the maximum mismatch that could occur due to the production tolerances involved in producing the required spacing of the openings 42 and the pins 40, in the same way that the oversized clearance of the opening 84, described earlier, is determined.

The two main reasons for binding of two tightly fitting guide pins are (a) that the initial positioning may be inaccurate, and (b) that their spacing may change under heavy braking. The initial positioning is taken care of by the clearance between the screw or pinch bolt and its corresponding hole in the flexible plate, and once this adjustment is made, it need never be disturbed. The change of spacing under braking loads is accommodated by the flexible plate of the invention. It should be noted that in addition to the positional tolerances mentioned, the pins or the openings may not be quite parallel to each other, nor square to their mountings, and the flexible plate of the invention is useful also for accommodating such inaccuracies.

I claim:

1. A sliding caliper disc brake comprising a carrier member for fixing to a vehicle; a caliper member adapted to straddle a minor portion of the periphery of a rotatable disc; guide means guiding said caliper member for sliding relative to said carrier member, said guide means including first and second receiving means containing openings, first connecting means joining said first and second receiving means to one of said caliper and carrier members, first and second pins which are snug sliding fits within said openings, and second connecting means joining said first and second pins to the other of said caliper and carrier members, one at least of said first and second connecting means including a resilient element; and an actuator for directly urging a friction pad onto one side of said disc to cause said caliper member to slide relative to said carrier member to apply by reaction an opposite friction pad to the other side of said disc.

2. A disc brake according to claim 1, wherein said resilient element comprises a flat steel plate.

3. A disc brake according to claim 2 wherein said second connecting means include said plate and means securing said first pin to said plate, and wherein said plate has a region offset from said first and second pins, said second connecting means including means securing said region to said other of said caliper and carrier members.

4. A disc brake according to claim 3 wherein said plate has first and second limbs extending symmetrically from said region, said second connecting means including means securing said first pin to said first limb and means securing said second pin to said second limb.

5. A disc brake according to claim 2 wherein said first receiving means comprises a first socket, wherein said first connecting means include said plate and means securing said socket to said plate, and wherein said plate has a region offset from said first and second receiving means, said first connecting means including means securing said region to said one of said caliper and carrier members.

6. A disc brake according to claim 5 wherein said second receiving means comprises a second socket and wherein said plate has first and second limbs extending symmetrically from said region, said first connecting means including means securing said first socket to said first limb and means securing said second socket to said second limb.

7. A disc brake according to claim 2 wherein said one at least of said first and second connecting means includes bolts securing said plate to said caliper member.

8. A disc brake according to claim 7 wherein said caliper member comprises two parts and joining means securing said two parts together, said bolts forming said joining means.

9. A disc brake according to claim 1 wherein said resilient element comprises a U-shaped element having a first limb and a second limb, said second connecting means including said element, means securing said first pin to said first limb and means securing said second limb to said other of said caliper and carrier members.

10. A disc brake according to claim 9 wherein said second connecting means further include a second resilient element comprising a U-shaped element having a first limb and a second limb, means securing said second pin to said first limb of said second resilient element, and means securing said second limb of said second resilient element to said other of said caliper and carrier members, and wherein said other of said caliper and carrier members comprises said caliper member.

11. A disc brake according to claim 9 wherein said first pin has an axis and said second limb contains an opening offset from said axis, said means securing said second limb to said other of said caliper and carrier members comprising a bolt received in said opening.

12. A disc brake according to claim 1 wherein said resilient element comprises a steel plate of substantially constant thickness.

13. A disc brake according to claim 1 wherein said resilient element comprises a steel plate of bent form, said plate having a first portion and a second portion deflectable relative to said first portion, and wherein said second connecting means include means securing said first portion to said other of said carrier and caliper members and means securing said first pin to said second portion.

14. A disc brake according to claim 13 wherein said plate further has a third portion interconnecting said first and second portions and wherein said first and second portions are both flat and are arranged parallel to and spaced from each other.

15. A disc brake according to claim 13 wherein said plate has a recessed central portion having a base comprising said first portion, has a first limb forming said second portion, and also has a second limb, said first and second limbs extending symmetrically from said recessed portion and said second connecting means including means securing said second pin to said second limb.

16. A disc brake according to claim 1 wherein said one at least of said first and second connecting means include a bolt, said resilient element having an opening receiving said bolt, said opening being oversized relative to said bolt.

17. A disc brake according to claim 1 wherein said second connecting means include said resilient element, said element connecting both said first and said second pins to said other of said caliper and carrier members, and wherein said receiving means and first connecting means are integral with said one of said caliper and carrier members.

18. A disc brake according to claim 1 including flexible boots sealing said pins in said openings.

19. A disc brake according to claim 1 wherein said caliper member and said carrier member comprise forged parts.

20. A disc brake according to claim 1 wherein said actuator comprises a cylinder integral with said caliper member so as to be slidable therewith, and a piston located within said cylinder.

* * * * *